Oct. 16, 1962 D. Q. FULLER 3,059,124
TRANSISTOR WITH TWO BASE ELECTRODES
Filed Sept. 5, 1958
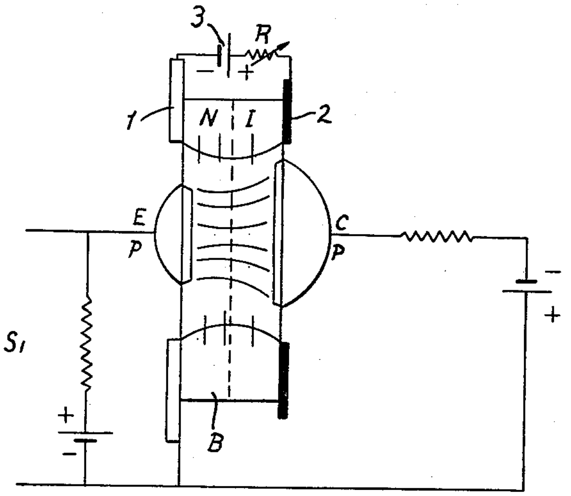
Inventor
D. Q. FULLER
By
Holcombe, Wetherill & Brisebois
Attorneys 3,059,124

TRANSISTOR WITH TWO BASE ELECTRODES

Dennis Q. Fuller, Cambridge, England, assignor to Pye Limited, Cambridge, England Filed Sept. 5, 1958, Ser. No. 759,196
Claims priority, application Great Britain Sept. 10, 1957
1 Claim. (Cl. 307—88.5)

The present invention relates to transistors, particularly of the PNIP and NPIN types.

According to the invention, a second base electrode is added on the face of the base wafer opposite to that where the normal base connection is applied. The wafer is thus sandwiched between two washer-like connections across which a potential difference is applied to produce a field across the wafer which tends to concentrate the current flow between the emitter and collector electrodes in a manner somewhat similar to the focussing of a light beam. The potential gradient of the field extends substantially parallel to the flow of current between the emitter and collector.

Referring to the accompanying drawing, which shows a PNIP transistor according to the invention, E is the emitter and C the collector on opposite sides of the base wafer B. 1 is the usual base electrode and 2 is the second base electrode of washer-like form. A battery 3 is connected across the electrodes 1 and 2 to apply a potential across the NI base region in the direction which will give repulsion of holes from a cylindrically symmetrical I region under the focussing electrode. Thus the holes which might be recombined in this region will thereby be focussed towards the collector. The result is an increase in the amplification factor of the transistor. Variation of the focussing potential can be used as a correction for beta fall-off. The focussing electrode 2 can also serve as a second signal control input point. A resistor R is connected in series with battery 3 and may be varied to control the amplification factor. Alternatively this may be achieved by the injection of a signal across resistor R.

The invention may also be applied to other transistors having a built-in accelerating field region in the base.

I claim:

A transistor comprising a base wafer of semiconductor material having an emitter on one face of the wafer and a collector on the opposite face of the wafer, said base wafer further having a conductivity characteristic which varies from one face to the other face and constituting an NI base region, a first annular base electrode attached to one face of the wafer and surrounding the emitter, a second annular base electrode attached to the other face of the wafer and surrounding the collector and means for applying a potential across the first and second base electrodes to produce a potential gradient extending substantially parallel to the flow of current between the emitter and collector and focussing the current to the collector.

References Cited in the file of this patent

UNITED STATES PATENTS

| | | |
|---|---|---|
| 2,754,431 | Johnson | July 10, 1956 |
| 2,842,668 | Rutz | July 8, 1958 |
| 2,857,527 | Pankove | Oct. 21, 1958 |
| 2,870,345 | Overbeek | Jan. 20, 1959 |
| 2,922,897 | Maupin | Jan. 26, 1960 |